Nov. 10, 1964    R. G. SCHULTZ    3,156,145
TAILSTOCK CENTER
Filed April 30, 1963
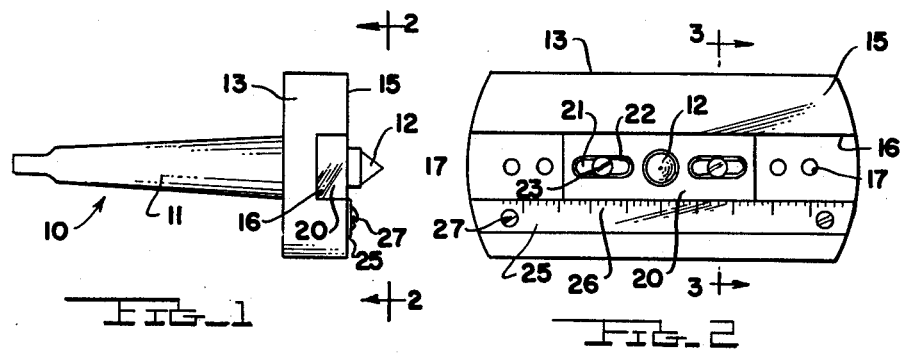
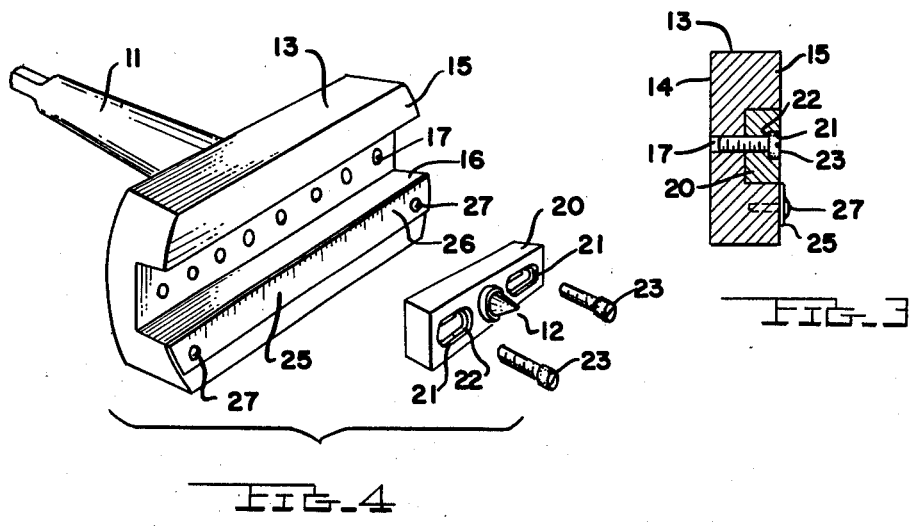
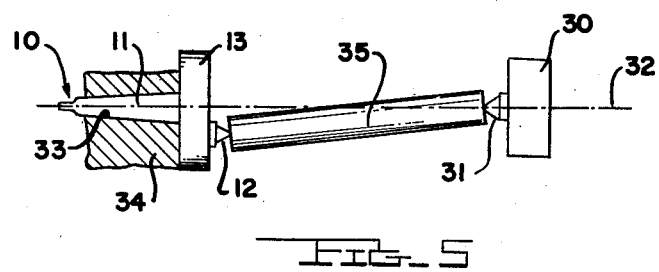
INVENTOR.
RICHARD G. SCHULTZ
BY
Cullen, Sloman & Canton
ATTORNEYS

3,156,145
TAILSTOCK CENTER
Richard G. Schultz, 29618 Ann Arbor Trail,
Garden City, Mich.
Filed Apr. 30, 1963, Ser. No. 276,786
3 Claims. (Cl. 82—15)

This invention relates to a tailstock center and more particularly, to a tailstock attachment useful for cutting tapers upon a workpiece.

In cutting tapers upon a workpiece, using a lathe, it is conventional to offset the tailstock a predetermined amount so as to offset the axis of the workpiece relative to the central working axis of the lathe. Shifting the tailstock is a difficult and time-consuming task.

Hence, it is an object of this invention to provide a tailstock dead-center arranged to be held by a conventional lathe tailstock but having a shiftable work-supporting point arranged for accurate movement off-center of the lathe working axis to arrange the workpiece off-center and thereby permit accurate cutting of a taper and accurate reproduction of desired tapers at a later date.

A further object of this invention is to form such a center which is inexpensively and simply constructed and yet which can be adjusted into predetermined center and off center positions quickly and easily by the lathe operator.

These and other objects and advantages of this invention will become apparent upon reading the following description, of which the attached drawings form a part.

In these drawings:

FIG. 1 is an elevational view of the tailstock center.

FIG. 2 is an end view taken in the direction of arrows 2—2 of FIG. 1.

FIG. 3 is a cross-sectional view taken in the direction of arrows 3—3 of FIG. 2.

FIG. 4 is an exploded, perspective view of the center.

FIG. 5 is a schematic view, to a reduced scale, showing the position of a workpiece when mounted upon the device herein.

Referring to the drawings, the tailstock center 10, includes an elongated, tapered shank 11 of conventional construction and adapted to be fitted into the socket of a conventional lathe tailstock (not illustrated). It also includes a workpiece supporting point 12 and an elongated, flat plate 13 arranged perpendicular to the axis of the tapered shank 11 and having a rear face 14 permanently secured at its center to the large end of the shank. The forward face 15 of the plate is provided with an elongated, uniform cross-sectional groove 16 extending from end to end, and having a number of aligned, threaded openings 17 formed in the base of the groove along a line which passes through the center axis of the shank.

The workpiece supporting point 12 is fixed to a slider block 20 which is snugly, but slidably fitted within the groove 16 for endwise sliding in said groove. The slider block is provided with a pair of elongated openings 21, which openings are larger at the exposed face of the slider block than at the rear face thereof so as to provide shoulders 22 against which the heads of fastener screws 23 are abutted. These screws are selectively fastened to predetermined threaded openings 17 to initially position the block within the groove. Upon final positioning of the block, the screws are tightened to hold the block in its predetermined position.

Fastened to the exposed face 15 of the plate 13 along one edge of the groove 16 is an elongated metal scale 25 having measuring indicia 26 formed thereon and held in place by screws 27. A corresponding indicium or marking 28 is formed at the center of the exposed face of the slider block. Thus, the lathe operator, by aligning the marking 28 up with the selected mark of indicia 26, can offset the point 12 the desired distance.

In operation, as schematically illustrated in FIG. 5, the lathe rotative parts 30 with its live center 31 and the shank 11 are co-axial with the center working axis 32 of the lathe, the shank 11 being fitted within the socket 33 of a tailstock 34.

The lathe operator arranges the plate 13 so that the groove is horizontal, this being accomplished merely by placing a hand level upon the flat, top surface of the plate. Then, by loosening the screws 23 and inserting them into the properly threaded holes 17, he sets the slider block 20 a predetermined distance off center, using the indicia 26 and mark 28 as the measuring means. Then the screws 23 are tightened and the workpiece 35 is arranged between the live center 31 and dead center 12, as is conventional, for cutting the predetermined taper upon the workpiece.

This invention may be further developed within the scope of the following claims. Accordingly, it is desired that the foregoing description be read as being merely illustrative of an operative embodiment of this invention and not in a strictly limited sense.

I now claim:

1. A tailstock dead-center comprising an elongated, tapered shank for fitting into a tailstock, an elongated flat plate having a rear face and a forward face, the plate being centrally secured at its rear face to the enlarged end of the shank and being arranged in a plane perpendicular to the axis of the shank, and a uniform cross-section, open groove formed in said forward face, said groove extending the full length of the plate and opening forwardly; a slider block snugly, but slidably, fitted in said groove for sliding endwise along the length of the groove, with one face of the block being exposed at the opening of said groove, a workpiece supporting point secured to the center of said one face of said slider block; openings formed in said slider block on the opposite sides of said point, the openings each being elongated in a direction parallel to the groove, and a number of threaded openings formed in the base of said groove, and a screw fitted through each of said slider block openings for engagement with the slider block and for threaded engagement with one of the threaded openings for adjustably fixing the position of the slider in said groove and thus to offset the point a predetermined amount relative to the axis of the shank.

2. A construction as defined in claim 1, and including indicia formed on the forward face of the plate adjacent one edge of the groove and corresponding indicium formed on the slider block exposed face, for determining the offset of the block and points relative to the axis of the shank.

3. A work holding taper attachment for lathes and the like having a central, working axis, upon which a workpiece is normally co-axially arranged, comprising a flat plate having a forward face and a rear face and fastening means connected to said rear face for holding the plate perpendicular to said working axis; an open, uniform cross-section groove formed in the forward face of the plate and extending from side to side of the plate, a slider block snugly, but slidably, fitted within said groove and having a forward face exposed at the groove opening; a fixed workpiece supporting point secured to the slider block forward face; and slider block fastener means including an elongated opening, arranged parallel to the groove, extending through the block and having a shoulder formed within said opening between the slider block exposed face and its opposite face, a headed screw fitted in said opening with its head abutting said shoulder, and a number of threaded openings formed in the plate at the base of said groove for selectively engaging the screw with one of said threaded openings for securing the bolck in predetermined fixed positions within said groove, for thereby offsetting said point at predetermined distances from said central working axis.

References Cited in the file of this patent
UNITED STATES PATENTS

| | | |
|---|---|---|
| 809,353 | Zange | Jan. 9, 1906 |
| 1,319,585 | Hunt | Oct. 21, 1919 |

FOREIGN PATENTS

| | | |
|---|---|---|
| 1,053,642 | France | Sept. 30, 1953 |

OTHER REFERENCES

Popular Science, February 1947, pp. 174–176. Copy in Group 340.